United States Patent [19]
Keating

[11] 3,990,433
[45] Nov. 9, 1976

[54] GAS BURNER FLAME TEMPERATURE AMPLIFIER

[76] Inventor: Richard T. Keating, 715 S. 25th Ave., Bellwood, Ill. 60104

[22] Filed: July 30, 1975

[21] Appl. No.: 600,464

[52] U.S. Cl. .................. 126/391; 99/403; 126/360 R; 431/215; 431/351
[51] Int. Cl.² ..................... A47J 27/00
[58] Field of Search ............ 431/8, 10, 11, 165, 431/215, 166, 351; 126/21 A, 360 R, 391; 99/403

[56] References Cited
UNITED STATES PATENTS

| | | |
|---|---|---|
| 3,291,182 | 12/1966 | Dow et al. .................. 431/165 |
| 3,313,288 | 4/1967 | Aito .................. 126/391 |
| 3,525,325 | 8/1970 | Perl .................. 431/215 X |
| 3,682,156 | 8/1972 | Perl .................. 126/21 A |
| 3,760,793 | 9/1973 | Anetsberger et al. .................. 126/391 |
| 3,907,210 | 9/1975 | Dow .................. 431/165 X |

Primary Examiner—Edward G. Favors
Attorney, Agent, or Firm—John R. Diver; Chas. W. Rummler

[57] ABSTRACT

A method and an apparatus for increasing the combustion flame temperature of a partially-aerated atmospheric gas burner heater and the heat transfer therefrom by the injection of jets of preheated secondary air into the combusting chamber transiting the flow of burning gases thereof.

7 Claims, 5 Drawing Figures

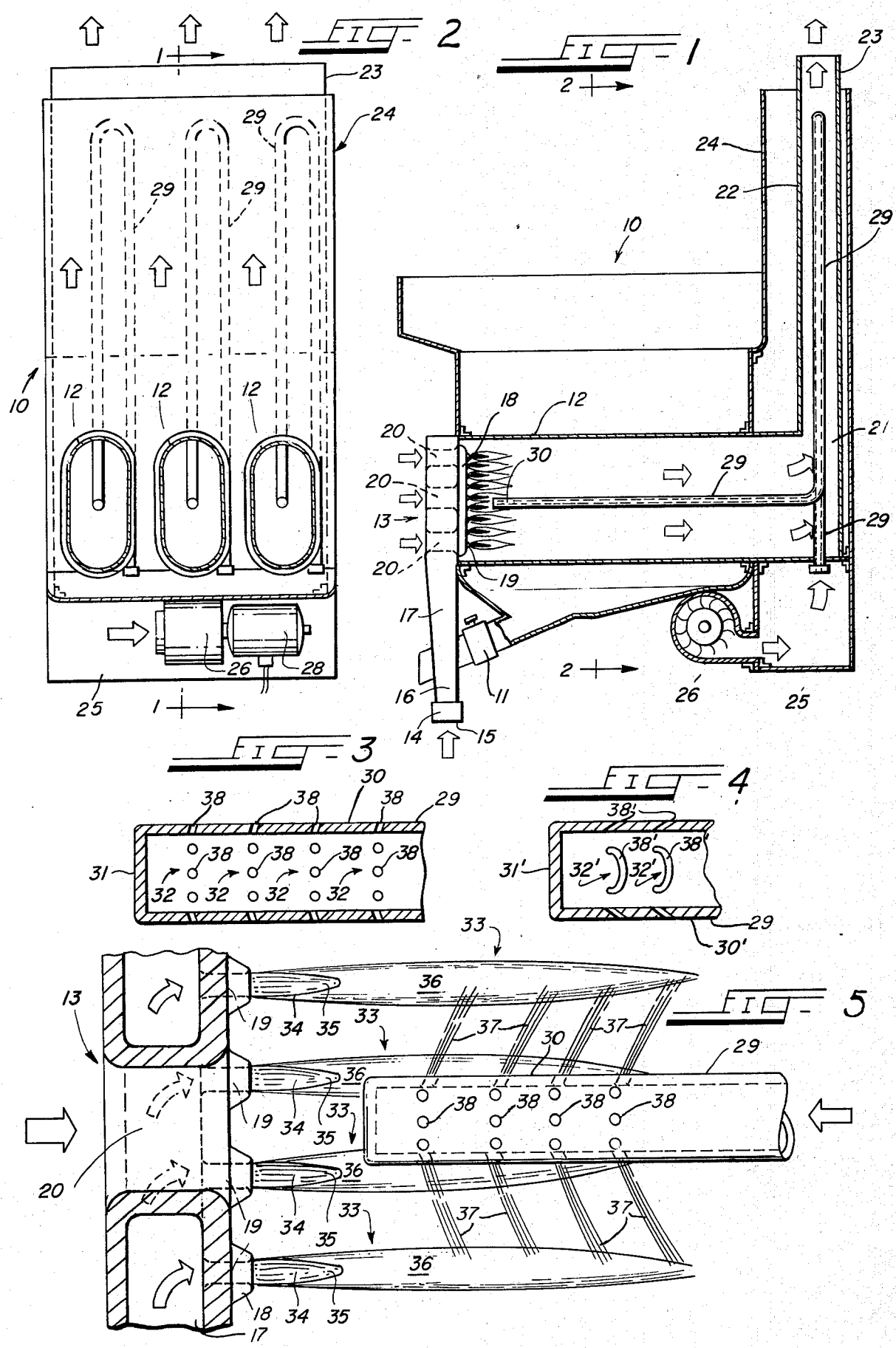

GAS BURNER FLAME TEMPERATURE AMPLIFIER

BACKGROUND OF THE INVENTION

The objective of the atmospheric gas burner combustion heater designer is to arrange heat transfer surface and fuel burning equipment in such a manner as to maximize combustion temperatures and economic investment in the accomplishment of a heating purpose. Combustion chamber walls absorb heat from the combusting gas by means of radiation and convection. Heater designers must proportion and construct heat absorbing surfaces in such a manner as to make the most of the heat released by the fuel when it chemically combines with the oxygen in the air supplied. In some cases, the best means of transferring heat may be convection and in other cases, it may be by radiant means. In the case of small heaters such as deep fat fryers, the size of the equipment is relatively small so that radiant heat transfer predominates.

The classic effect of regenerative preheat on the maximization of heat transferred to a working fluid heat sink can best be comprehended by means of the Sankey diagram. This diagram shows that in the case of a regenerative preheat cycle, the total heat of the gas in the combustion chamber of the heater is the sum of heat of chemical combination in the fuel added plus the heat of preheat in the air entering the combustion chamber. The amount of heat in the preheated air corresponds to that extracted by the regenerator from the exhaust gases from the combustion chamber. Heat losses going up the stack comprise the heat contained in the flue gas plus that due to incomplete combustion. The result is that in the regenerative cycle, heat is added at a higher mean temperature so that the thermodynamic efficiency is improved.

Incomplete combustion of the fuel added by the atmospheric gas burner can occur when all the chemical energy locked in the fuel is not released by combination with available oxygen. Not only that, but for combustion to occur at all, fuel and air must be mixed in the right proportions and at the right temperature. For all hydrocarbon fuels, whether gaseous or liquid, there is a very limited range of fuel-air ratios which will support combustion. Too many fuel molecules for too few of oxygen or too many of oxygen in air for too few of fuel, even if in close proximity to each other and at the right temperature, will not sustain continuous burning.

The probabilities that fuel and oxygen molecules will be in position to chemically combine is enhanced by the process of mixing fuel and air. Mixing creates small-scale turbulence in the combustion zone which transports fuel molecules and oxygen molecules for more probable chemical combination and accelerates combustion toward greater completion in a lesser space and a shorter time. Small-scale turbulence adjacent to the inner surface of the wall of the combustion chamber also improves the convective heat transfer through the boundary layer adjacent to that wall by its scrubbing action. However, in the design of small heaters, improved heat transfer by convective means is a secondary consideration because such equipment is normally designed for radiant heat transfer.

In small, partially aerated, atmospheric gas burner combustion heaters such as are used in deep fat fryers, heat transfer through the wall of the combustion chamber is predominantly of a radiant nature since radiant energy transfer varies inversely with the square of the distance between the source of heat and the wall of the combustion chamber and directly with the difference between fourth powers of the absolute temperatures thereof. For a combustion chamber of half the size and twice the combustion temperature, the temperature of the combustion chamber wall which is radiantly heated is up to 64 times as high. Thus, in properly-designed small heaters, radiant heat transfer is substantially greater than convective heat transfer. Small heater design practice is then based primarily upon radiant heat transfer concepts.

In designing an atmospheric gas burner, initial considerations may deal with physical dimensions and structure of the burner head and burner ports. The gas input rating desired will be known within reasonable limitations and from that information the total port area can be closely approximated. Shape and size of burner head must be adapted to the space available and uniform flame distribution over the area to be heated must be obtained. Number and size of ports to secure the desired port area may then be calculated. Spacing of ports on the burner head for good flame travel on ignition at one point, and arrangement such that each port will be provided with an adequate, but not too great an amount of secondary air, may then be planned. In a general way dimensions of other parts of the burner can be derived from their relations to total port area.

Like other fundamentals of burner construction, many of those relating to burner ports are more or less generally recognized. It has been considered, for example, that flame characteristics are affected by the form of the port, whether drilled, slotted, ribbon, raised, or flat; by port size, depth, spacing, number of rows; by burner head temperature, and air-gas mixture temperature. Different fuel gases may also require different treatment of ports.

When the velocity of an air-gas mixture normal to the inner cone surface of flames on the ports of an atmospheric-type burner exceeds the flame speed of that particular mixture, the flame will lift or blow off the ports. Varying degrees of lifting may result. If the velocity is increased, a point will be reached where the flame will be extinguished. A lesser velocity may permit the flame to burn at some distance from the port, and as the velocity is still further decreased the flame will approach the port, first with lifting occurring around part of the edge of the flame and then as the velocity becomes equal to or less than the flame speed, the base of the flame remains on the port. Lifting may be obtained by sufficiently increasing the percentage of primary air or with no primary air by increasing the gas velocity until it exceeds flame speed. The point at which the flame starts to leave the port from a single port burner or where several flames start to lift from a multiport burner is known as the lifting limit. This characteristic is so definite that it has been used for many years as a measure of burner performance. It is usually expressed in percentage of primary air at which lifting occurs for a given set of conditions.

Most gas appliance burners are so designed that lifting of flames is avoided by regulation of primary air, usually by means of an air shutter. Except under special conditions where the appliance is designed to utilize blowing flames, lifting of flames from ports is undesirable. It usually indicates that some quantity of unburned gas is escaping from the flame, or that the gas is being only partially burned. Burner applications usually require a fairly definite range of values of primary air for good combustion. A burner with a low lifting limit may therefore not be able to attain the minimum value of this required range of aerations without producing lifting, and therefore incomplete combustion. Ignition of gas-air mixtures at or above the lifting limit is difficult, and flame travel from port to port is unreliable. Excessive lifting or blowing may in certain burners produce disturbing noise. Efficiency of heat transfer will also decrease.

As the speed of flame propagation is such an important factor in tendency of flames to lift from ports, it follows that different fuel gases will have greatly different lifting characteristics. Typical gases were selected having the greatest extremes in lifting limits. The lower the lifting limit the greater the tendency for a flame to lift from the port. On this basis the low btu high inert content natural gas has the greatest tendency to lift, whereas high hydrogen content manufactured gas has the least tendency.

Design of the burner has a most important influence on possibility of elimination of lifting of flames. General rules for burner construction recognize such factors as size of port, port depth, and port spacing to prevent lifting. Necessity of controlling primary air, of having adequate air injection, of good mixing of primary air and gas, and of uniform distribution of air-gas mixture to ports is also understood and will be presented in subsequent paragraphs.

Appearance of yellow-tips in flames on atmospheric gas burners has been used for many years as a limit in determining flexibility and satisfactory performance of such burners. Yellow-tips may be observed when the primary air supply is decreased to the point where yellow-tips first appear in the flame and that point is known as the yellow-tip limit. The opposite extreme to the yellow-tip limit is the lifting limit previously described where primary air is increased to the point where flames begin to lift or blow from the ports. Formation of yellow color in the flame is probably due to incandescent carbon particles resulting from the combustion of hydrocarbons. Hydrogen, for example, burns with an almost colorless blue flame and would never produce a yellow-tip. Carbon monoxide burns with a thin blue flame even in the absence of primary air. It may be reasoned, therefore, that yellow-tips are mainly produced in the combustion of hydrocarbons.

It should not be assumed from this discussion that yellow-tips or yellow flames are always undesirable. The opposite may be true. Many yellow flame burners which admit no primary air are being used. Other burners are intentionally designed to give long, soft, yellow-tipped flames with restricted primary air supply. Underlying reasons for such designs are to make use of radiant heat from the yellow flame to increase heat transfer; to permit exposure of more heating surface to the flame; to avoid troubles from flash-back, air shutter settings, dust, dirt, and lint stoppage of primary air intake openings; and possibly reduced cost of manufacture. When yellow flame burners are used the combustion chamber, flueways, and heating element construction are designed for them, generally being made larger than for a blue flame.

In those appliances and burners designed for blue flames, yellow-tips are considered undesirable. They signal the deposition of carbon on heating surfaces above the burner resulting in decrease in efficiency and necessitating periodic cleaning. Carbon deposits in and above pilot burners causing outage are especially troublesome. They indicate restriction to primary air flow either by accidental closing of the air shutter or stoppage by dust, dirt, and lint, or that the adjustment rate is too high. Because blue flames are usually much shorter than yellow flames for a given gas input rate to a burner, the distance between burner and top of combustion chamber or first heat transfer surface is usually less than for a yellow flame. Appearance of yellow-tips on a blue flame burner may therefore cause impingement of flame and incomplete combustion. Lengthening of flame by restricted primary air to a pilot burner, for example, may also cause excess corrosion of heat transfer surface above it, and eventual burning through.

Fuel gases vary considerably in their tendency to produce yellow-tips. This is probably caused by the different percentages of hydrocarbons and the type of hydrocarbon present. Unsaturated hydrocarbons such as ethylene, benzene, and acetylene have the greatest propensity toward yellow flames. They are frequently referred to as "illuminants". Among the saturated hydrocarbons of the paraffin series those with the highest molecular weight such as pentane, butane, and propane produce yellow-tips more readily than lower molecular weight ethane and methane.

Certain factors of burner design also have an influence on appearance of yellow-tips. These are mainly centered in the construction of the burner head and ports. In typical burners with various gases as, for example, port size, port depth, raised port height and diameter, port spacing, and number of rows of ports affect production of yellow-tips.

When the velocity of air-gas mixture flow through burner ports is reduced below speed of flame propagation at any point in the flame surface, the flame will flash-back through the port. Tendency to flash-back varies with the type of fuel gas, port size, port depth, primary air, gas input rating, and temperature of ports and air-gas mixture. Possibly materials used in burner head construction having a wide difference in properties, as for example, metallic and ceramic substances, have a bearing on flash-back. Flash-back may also be caused by a momentary excessive down-draft on the flame. A leaking manual or automatic burner valve permitting a small gas flow which is insufficient to maintain combustion at burner ports is one of the most serious offenders in causing flash-back.

In burner operation, flash-back is to be avoided at all times. Most undesirable results of flash-back are the generation of products of incomplete combustion, sooting or clogging of interior of burners and orifices, and damage due to overheating of burners. Flash-back usually creates an objectionable sound similar to a loud noise of extinction of flames. Lighting-back, wherein main burner flames on ignition flash outside the combustion chamber and light gas at the orifice, causes an undesirable condition similar to flash-back through the ports, but should not be confused with it.

Propensity of flames to flash-back is directly proportional to ignition velocity of fuel gases. The greater the ignition velocity, the greater the tendency to flash-back. Therefore, gases high in hydrogen and carbon monoxide (the manufactured gases) will have far greater flash-back tendencies than hydrocarbon gases such as natural or liquefied petroleum gases. In gas appliance performance nearly all reported difficulties from flash-back originate with manufactured gases. On natural gas it is partically never encountered.

Flash-back tendencies also vary with percentage of primary air and air-gas mixture temperature for fuel gases. Maximum velocity for coke-oven gas, for example, is attained at 85% primary air, whereas it is reached at about 90% primary air on natural gas and 88% on butane. At a normal percentage of primary air for atmospheric burner of 60% there is no tendency for natural or butane gas to flash-back even at very low gas input rates per sq. in. of port area; on coke-oven gas flash-back would not occur even at very low input rates but the limit of 65% is closely approached.

Whether material from which ports are formed is a good conductor of heat (metals) or resistant to heat flow (ceramics) also seems to affect flash-back tendencies, being less pronounced for ceramic material than for metals. The greater friction loss through ceramic ports and resistance to heating up of gas-air mixtures in burner head, compared to metallic ports, may account for their resistance to flash-back. It is probable that flame velocity increases slightly with increase in temperature — for coke-oven gas to the extent of 15.5 ft. per second for an increase in temperature of 1000° F. As previously shown, greater flame velocity increases flash-back propensity of gases.

With drilled ports flash-back may be controlled by using the proper size and depth of port. They are interrelated — the deeper the port, within certain limits, the larger the size that may be used without danger of flames flashing through it. Flash-back is first realized near the edge of the port, since the mixture velocity at that point is considerably less than the average velocity through it. For this reason, poor drilling off center of raised port section (causing one edge of the port to be much more shallow than the rest) or an out-of-round port, will provide a point of decreased velocity and source for flames to flash through the port. In smaller ports there may be less variation in mixture velocity across the port and apparently flames have a lesser tendency to flash-back for this reason. In addition, heat transmission from base of flame is probably greater with the smaller port. It has also been established in previous work that flash-back occurs at higher gas input ratings for larger ports and over a wider range of primary aerations. A No. 36 D.M.S. port is considered the largest size that may be used to avoid difficulty from flash-back with a fast burning manufactured gas. On most manufactured gases a No. 38 port or smaller is preferred. (Schnidman, "Gaseous Fuels", Amer. Gas Assoc., 1954, pages 155-158.)

The character of the burner flame is controlled by the amount of primary air which is allowed to flow into the gas stream as it issues from the orifice and proceeds into the burner head. The flame produced consists of several parts. Inside of the center of the flame there is an unburned mixture of gas and air moving forward at the same speed at which the flame is trying to move backward. The flame front is outlined by a brightly colored area often referred to as the inner cone. Its color is variously described as bright blue or green. A rapid chemical reaction involving a decomposition of the constituents of the fuel occurs in this area. It is sometimes called the hydroxylation area, as alcohols, aldehydes, carbon monoxide, and other partially oxidized constituents are formed there. The final and complete combustion takes place in the larger outer envelope which surrounds the inner cone. This part of the flame is usually only lightly colored, but it can be made more obvious by viewing against a black background or in a darkened room.

The proportion of air which is allowed to enter the burner head with the combustible gas determines the size, shape and temperature of the flame. As the amount of primary air is decreased, the flame front moves outward from the port, the inner cone becomes larger, the brightly colored reaction zone surrounding it becomes thinner and the temperature at the tip of the cone increases. As the fraction of air is further reduced, the color of the reaction zone slowly fades out, usually becoming fuzzy first at the tip of the inner cone and the temperature at the tip of the cone decreases.

It will be apparent from this description that the general requirements for a high temperature burner flame cover a range of primary air-gas adjustments which result in a considerable change in the size, shape, and general character of the flame. These are characterized by short, sharply defined, and often fluttery flames, ignition and/or extinction noises, and general flash-back tendencies. Flames with low primary air are considered to be soft flames. These are characterized by longer, less sharply defined, and rather wavering flames, with a minimum of ignition or extinction noise or flash-back tendencies.

The characteristics of both hard and soft flames and the lower temperatures thereof make them unsuitable for burners. Good flames having high combustion temperatures should consist of three clearly defined parts; the relatively cool darkened inner zone called the cone, the brightly colored decomposition or reaction zone, and the less distinct outer sheath called the mantle in which the combustion is completed.

The flame which gives the maximum flexibility is one to which the primary air has been reduced until the brightly colored reaction zone has become as thin as possible and yet remains clearly defined without breaking or fuzziness (Idem, page 180).

Although it might be expected that over-venting excess air would cause the flue temperature to fall, this is not always the case. A number of experiments have been made in which the flue temperature has increased with over-ventilation. This has been accounted for in various ways, but it is suspected that the increased radiating power of the triatomic gases $CO_2$ and $H_2O$ formed with more complete combustion is an important factor involved. It is worth repeating at this point that the reducing of excess air can usually be done most effectively by restricting the flue outlet. Attempts to control over-ventilation by control of secondary air admission have not been so effective. There are automatic dampers on many appliances which are valuable for flue loss and excess air control during operation and standby (Idem, page 288).

Of importance in radiant-heat transmission from flames is the infrared radiation from the combustion products, water vapor and carbon dioxide, which overshadows convection at furnace temperatures. If blackbody radiation passes through either of these gases, absorption occurs at certain wave lengths. Conversely, if these gases are heated, they emit radiation at those same wave lengths. Consider a hemispherical gas mass of radius L containing carbon dioxide of partial pressure $P_c$, and let the problem be the evaluation of radiant-heat interchange between the gas at temperature $T_g$ and a small element of surface at temperature $T_s$, located on the base of the hemisphere at its center. Per unit of surface, the emission of the gas to the surface is $\sigma T^4_g \cdot \epsilon_g$ where $\epsilon_g$ denotes gas emissivity. For carbon dioxide, $\epsilon_g$ depends on $T_g$, the total pressure, and the product term $P_cL$. The absorption, by the gas, of radiation from the surface is $\sigma T^4_s \cdot \alpha_g$ where $\alpha_g$ is the absorptivity of the gas for black-body radiation from the surface. Approximately, $\alpha_g$ is obtained from the gas-emissivity chart at the same value of $P_cL$ as before but at the temperature $T_s$ instead of $T_g$. Such an approximation is adequate if the gas is hotter than the surface and the absorption term consequently of secondary importance.

The net radiant-heat interchange is then $$(\sigma T^4_g \epsilon_g - \sigma T^4_s \cdot \alpha_g)\epsilon_s$$

where the term $\epsilon_s$ allows for the non-black character of the surface.

For water vapor, the gas emissivity $\epsilon_g$ is similarly determined by $T_g$ and the product $P_wL$. The absorptivity is given with adequate accuracy by use of a gas emissivity corresponding to $P_wL$ and $T_s$.

When carbon dioxide and water vapor are present together, the total radiation due to both is somewhat less than the sum of the separately calculated effects because each gas is somewhat opaque to radiation from the other. The final formulation of interchange between a gas and its bounding surface is then $$q/A = \epsilon_s[\sigma T^4_g(\epsilon_v,CO_2 + \epsilon_v,H_2O) - \sigma T^4_s(\alpha_v,CO_2 + \alpha_v,H_2O)](1-K)$$

The preceding expression was formulated for the case of interchange between a gas hemisphere and a spot on its base, i.e., for the case in which the length of path L of the radiant beam is the same in all directions. For gas shapes of industrial importance, it is found that any shape is approximately representable by an "equivalent" hemisphere of proper radius, or that there is a mean beam length which can be used in evaluating gas emissivities and absorptivities.

If gas radiation occurs in a space in which there is a continuous change in temperature of the gas and the surface from one end to the other of the interchanger, exact allowance can be made by conventional graphical integration. A fair approximation may be obtained by using a mean surface temperature equal to the arithmetic mean, and a mean gas temperature equal to the mean surface temperature plus the logarithmic mean of the temperature difference, gas to surface, at the two ends.

$$T_{s\ avg} = (T_{s_1} + T_{s_2})/2$$

$$T_{g\ avg} = T_{s\ avg} + \frac{(T_{g_1} - T_{s_1}) - (T_{g_2} - T_{s_2})}{2.3 \log[(T_{g_1} - T_{s_1})/(T_{g_2} - T_{s_2})]}$$

(Marks, "Mechanical Engineering Handbook", 6th Edition, pages 411–413.)

Of greatest importance in the radiant-heat transmission from flames is the static temperature of the gas in the flame where the final stages of combustion are taking place and the temperature is a maximum. The Energy Equation balances the energy in the combustion of a fuel by chemical reaction with a mixture of air containing excess oxygen in a constant-pressure process comprising a steady-flow of the mixture into a combustion chamber and the steady-flow of products therefrom, and in which heat is being transferred out of the chamber to reduce the temperature of the products flowing therefrom. The Energy Equation relating to the combustion process in the flame is as follows:

$$C + U_m + PV_m = U_p + PV_p + Q_{out}$$

where:

C = Chemical energy liberated by chemical reaction of fuel and oxygen.
$U_m$ = Internal energy of fuel-oxygen mixture before chemical reaction.
$U_p$ = Internal energy of products after chemical reaction.
$PV_m$ = Flow work of fuel-oxygen mixture before chemical reaction.
$PV_p$ = Flow work of products after chemical reaction.
$Q_{out}$ = Heat transferred out the combustion chamber.

Chemical energy, C, determined by the constant-pressure calorimeter process, is:

$$C = Q_p + (H_p - H_m)_t$$

where:

$Q_p$ = Heat value of fuel for constant-pressure calorimeter process or heat transferred out of combustion chamber to reduce the temperature of the products to that of the mixture before reaction.
$(H_p - H_m)_t$ = Increase in ehthalpy of products over mixture at the temperature of the product or the mixture in the constant-process calorimeter.

Note that C is only dependent on the chemical energy from the chemical reaction of fuel and oxygen in the presence of excess oxygen as determined by a constant-pressure calorimeter wherein the products of combustion are cooled to the initial temperature of the mixture, and that C is not dependent on the accelerated burning characteristics of the reacting fuel and oxygen whatever they may be as long as the chemical reaction is complete (or carried to the same degree of completion) at the point the static temperature, $T_g$, and the percentage of $CO_2$ and $H_2O$ concentration of the products are measured.

Solving the Energy Equation for the internal energy of the products after chemical reaction in the flame gives $$U_p = C + U_m + PV_m - PV_p - Q_{out}$$

which is a function of the maximum static temperature of the gas in the flame. Note that the internal energy of the products, $U_p$, is a function of the internal energy of the fuel-oxygen mixture before the chemical reaction, $U_m$. The internal energy of the fuel-oxygen mixture is, of course, dependent upon the preheat temperature of the secondary air added to the primary air in the gas burner. The "chill" of unpreheated secondary air added to the flame thus lowers the maximum gas temperature attained in the flame and greatly reduces the radiant-heat transmission therefrom by the fourth power of the flame temperature.

There is thus an established need for a small, partially-aerated, atmospheric gas burner combustion heater having increased combustion flame temperatures so as to maximize the heat transferred through the walls thereof for a given heat input supplied thereto.

SUMMARY OF THE INVENTION

The gist of this invention lies in a small commercial-grade, partially-aerated, atmospheric gas burner heater having increased combustion flame temperatures comprising a combustion chamber providing for the continuous introduction of a combustible mixture of gaseous fuel and primary and secondary air therein at one end and the exhaust of the products of combustion therefrom into a stack at the other end. A plurality of jets of preheated secondary air radially emanate from a central source within the combustion chamber transiting the flow of combusting gases before combustion is complete.

DESCRIPTION OF THE DRAWINGS

FIG. 1 is a side elevation view of a cross-section taken along line 1—1 of FIG. 2;

FIG. 2 is a front elevation view of a cross-section taken along line 2—2 of FIG. 1;

FIG. 3 is a fragmentary blow-up of a cross-sectional side elevation view of one embodiment of a preheated secondary air injector head having a cross-section taken along line 1—1 through the secondary air supply tube in FIG. 2;

FIG. 4 is a fragmentary blow-up of a cross-sectional side elevation view of another embodiment of a preheated secondary air injector head having a cross-section taken along line 1—1 through the secondary air supply tube in FIG. 2; and FIG. 5 is a fragmentary blow-up view of a burner head and secondary air injector head combination.

DESCRIPTION OF THE PREFERRED EMBODIMENT

Referring to FIGS. 1 and 2, a deep fat fryer pot 10 having approximately 2000 cubic inch volume comprises front and rear walls, left-hand and right-hand side walls which are separated from each other by about 14 inches, a dished bottom and an open top. A drain cock which is in fluid communication with the interior of pot 10 at the lowest point of the dished bottom thereof drains hot fat therefrom. Combustion chamber-heater tubes 12 each having an oblong cross-section which approximates a 2½ inch × 6 inch shape and an overall length of about 14 inches extend through openings in both front and rear walls therefore in sealed relation therewith. Partially-aerated, atmospheric gas burners 13 which embody conventional burner design practice each connect to and are in fluid communication with a respective opening in the front wall of a combustion chamber-heater tube 12. Burners 13 each comprise a mixer head 14 having a gas orifice which is mounted on a mixer face and an air shutter forming primary air openings 15 which are in fluid communication with the atmosphere. A throat section 16 therein is in fluid communication with the mixer head 14 and a divergent mixing tube 17 is in fluid communication with the throat 16. A burner head 18 having a multiplicity of raised-drilled burner gas ports 19 thereon is in fluid communication with the mixing tube 17 therein. Secondary air openings 20 through the burner head 18 to the atmosphere aurround and are interspersed between spaced groupings of the ports 19 in geometric array for uniform distribution of the introduction of a first major portion of the secondary air to the combustion chamber-heater tubes 12.

Exhaust manifold 21 of approximately 2 inches × 14 cross-section has front and rear walls jointed to left and right-hand side walls in sealed relation therewith and mounts its front wall on the outside of the rear wall of the pot 10. Cutouts in the front wall of manifold 21 each match and are in fluid communication with respective openings in the rear wall of the pot 10 for the emission of exhaust gases from the combustion chamber-heater tubes 12. Manifold 21 bears a sealed relation with the bottom and the side walls thereof. Exhaust stack 22 extends in a generally upward direction from the open top of the manifold 21 terminating in a top 23 for venting exhaust gases from the combustion chamber-heater tubes 12 to atmosphere. A heat shield 24 envelopes stack 22.

A second minor portion of the secondary air is supplied from a plenum chamber 25 of approximately 5 inches × 5¼ inches × 14 inches cubic dimension. Plenum chamber 25 comprises front and rear walls which are joined to a top and a bottom and two side walls in sealed relation therewith. Plenum chamber 25 mounts its top to the outside of the bottom of the manifold 21. An air blower 26 having its inlet open to the atmosphere mounts on the outside of the front wall of the plenum chamber 25 and is in flow communication with the interior thereof. A motor 28 having a source of electric power (not shown) operationally connects to the blower 26.

Second portion secondary air preheat tubes 29 of ¾ inch O.D. and No. 20 gage stainless steel tubing one for each combustion chamber-heater tube 12 each mount on the top of plenum chamber 25 and have their inlets in fluid communication with the plenum chamber 25. Preheat tubes 29 extend some distance up the interior of stack 22 from the bottom thereof and are placed therein one for each combustion chamber-heating tube 12 in a downstream location relative thereto. Preheat tubes 29 loop over in a reversal of direction at the top of their extension up the stack 22 some distance thereup and return back down the interior therein to a location which is directly behind a respective combustion chamber-heating tube 12 in a downstream direction. Preheat tubes 29 then turn in an upstream direction in concentric relation with the central axis of their respective combustion chamber-heating tube 12.

A gas flame 33 from the conventional atmospheric gas burner 13 contains an unburned mixture of gas and primary air which is moving out of the ports 19 at the same speed at which flame front 34 is moving backward therethrough, as shown in FIG. 5. Brightly colored inner cone 35 delineates the flame front 34 inside of which there proceeds an incomplete chemical decomposition of hydrocarbon constituents of the fuel to form such partially-oxidized products of combustion as alcohols, aldehydes and carbon monoxide. A lightly-colored mantle 36 wherein combustion is carried to completion and combustion temperature is maximized envelopes the inner flame front cone 35 and trails downstream therefrom by some distance.

Secondary air injection head 30 or alternative head 30' mount their inlets on the forward ends of and are in fluid communication with respective preheat tubes 29. Air injection heads 30 and 30', as shown in FIGS. 3 and 4, have axes which are concentric with the axes of combustion chamber-heating tubes 12 and are centrally located therein adjacent to and downstream of the burner heads 19. Air injection heads 30 and 30' terminate in closed-ends 31 and 31' respectively which are located adjacent to and downstream of the apices of the flame front cones 35, as shown in FIG. 5. Air injection apertures 38 and 38' are spaced circumferentially about and along the length of the injection heads 30 and 30'. Air jets 37 of preheated second portion of the secondary air which is supplied by the tubes 29 eject in a generally radial direction from each of the apertures 38 and 38' and transit through the mantles 36 of the flame front cones 35 thereabout as they emanate from the burner head 19.

Reference to FIG. 3 shows second portion secondary air injection head 30 having eight circumferentially equally-spaced circular apertures 38, as bored by a No. 32 drill therein, which are arranged in rows 32. Four rows 32 are located at ½" spacing relative to each other along the length of the head 30 with the first row 32 thereon spaced ¾" from the closed-end 31 thereof. Apertures 38 have axes which rake at an angle of 45° relative to the axis of the air injection head 30 in the downstream direction from the burner head 19.

Reference to FIG. 4 shows second portion secondary air injection head 30' having four circumferentially equally-spaced, elliptically-shaped apertures 38', as cut by a ⅜ inch diameter hole saw therein, which are arranged in rows 32'. Two rows 32' are located at ½ inch spacing relative to each other along the length of the head 30' with the first row 32' thereon spaced ¾ inch from the closed end 31' thereof. Apertures 38' have axes which rake at an angle of 60° relative to the axis of the air injection head 30' in the downstream direction from the burner head 19.

Although but two specific embodiments of this invention are herein shown and described, it will be understood that details of these constructions may be altered or omitted without departing from the spirit of the invention as defined by the following claims.

I claim:
1. An apparatus for increasing the burner head flame temperature in the combustion chamber of a partially-aerated atmospheric gas burner heater and the heat transfer to the heating tube therefrom comprising:
   a. A source of a pressurized second portion of secondary air;
   b. A means for preheating the pressurized second portion of secondary air in fluid communication with the source;
   c. A means for introducing the pressurized-preheated second portion of secondary air into the combustion chamber in fluid communication with the means for preheating thereof;
   d. A means for injecting the pressurized-preheated second portion of secondary air in fluid communication with the means for introducing the preheated second portion of the secondary air in the combustion chamber; and
   e. A means for transiting the gas burner flame with the preheated second portion of secondary air in fluid communication with each of said means for injecting said pressurized-preheated second portion of secondary air adjacent and centrally located relative to the burner head thereof.

2. An apparatus as set forth in claim 1 wherein the means for preheating the second portion of the secondary air comprises a plurality of second portion of secondary air preheat tubes each extending up the flue gas stack and returning back down therefrom.

3. An apparatus as set forth in claim 1 wherein the means for introducing the preheated second portion of the secondary air into the combustion chamber comprises a plurality of second portion of secondary air tubes each extending from the flue gas stack within the combustion chamber-heating tube to a point adjacent to the burner head thereof.

4. An apparatus as set forth in claim 1 wherein the means for injecting the preheated second portion of secondary air comprises a tubular wall, a closed-end bearing a sealed relation with the end of said tubular wall, and directional orifice means in said tubular wall distributed thereabout.

5. An apparatus as set forth in claim 1 wherein the means for transiting the gas burner flame with the preheated second portion of the secondary air comprises pressure jets of the preheated second portion of the secondary air.

6. An apparatus as set forth in claim 4 wherein the directional orifice means comprises a plurality of apertures each aperture having a shaped mouth for directing the flow of the preheated second portion of the secondary air outwardly therefrom.

7. An apparatus for increasing the efficiency of heat transfer from the burner flame of a partially-aerated atmospheric gas burner heater for deep fat fryers comprising a fat-containing vessel having front, rear, left-hand and right-hand side walls, a dished bottom and an open top; a drain cock at the lower point in said dished bottom in fluid communication with the interior thereof; a plurality of combustion chamber-heating tubes extending through openings in the front and rear walls of the vessel and the distance therebetween and bearing a sealed relation at each end therewith; a plurality of partially-aerated, atmospheric gas burner heads each connecting to and in fluid communication with an opening in a respective combustion chamber-heating tube in the front wall thereof; each burner head having a mixer head, an orifice mounted on a mixer face thereon, and an air shutter in fluid communication with the atmosphere mounted therewith; a throat section in fluid communication with the mixer head; a divergent mixing tube in fluid communication with the throat; a plurality of raised-drilled burner gas ports on each burner head each of which fluid communicates with the mixing tube; a plurality of openings in the burner head admitting a major portion of the secondary air to the combustion chamber in fluid communication with the atmosphere; a flue gas manifold having front, rear and bottom walls, open top and left and right-hand side walls joined in sealed relation each therewith to the other mounts on the outside of the rear wall of said fat-containing vessel; cutouts in the front wall of said manifold each fluid communicate with a respective opening in the rear wall of the fat-containing vessel; a flue gas stack extends in a generally upward direction from the open top of the exhaust manifold terminating in a top; a heat shield envelopes the flue gas stack on all sides thereof; a plenum chamber having front and rear walls joined to a top and a bottom and two side walls in sealed relation each therewith the other mounts its top to the bottom of the flue gas manifold; an air blower having its inlet open to the atmosphere mounts on the front wall of the plenum chamber in flow communication with the interior thereof; a motor having a source of electric power operationally connects to the air blower; a plurality of minor portion secondary air preheat tubes each mounts on the top of the plenum chamber and each fluid communicates therewith and extends some distance up the interior of the flue gas stack from the bottom to a top thereof and loops over in reversal of direction and returns back down the interior thereof to a point directly downstream of a combustion chamber-heating tube and turns and extends in an upstream direction in concentric relation with the combustion chamber-heating tube; a plurality of minor portion secondary air injection heads having closed ends each mount on the forward end of and fluid communicate with a respective preheat tube each injection head having axial concentric relation with a respective combustion chamber-heating tube and its closed end adjacent relation with the respective burner head; three rows of eight equally-spaced circular air injection orifices, each orifice having No. 32 drill size bore, distribute in spaced relation along the length of the head with ½ inch pitch with the most forward row thereon spaced ¾ inch from the closed end of the injection head, each orifice rakes its bore-axes at an angle of 45° relative to the axis of the air injection head in a negative direction relative thereto.

* * * * *